Dec. 3, 1940. J. J. BLACK 2,223,778

TRAILER TRUCK BODY

Filed March 25, 1937

INVENTOR.
BY James J. Black
Wood & Wood ATTORNEYS

Patented Dec. 3, 1940

2,223,778

UNITED STATES PATENT OFFICE 2,223,778

TRAILER TRUCK BODY

James J. Black, Cincinnati, Ohio, assignor to The Trailer Company of America, Cincinnati, Ohio, a corporation of Delaware Application March 25, 1937, Serial No. 133,028

2 Claims. (Cl. 189—46)

This invention relates to trailer or truck bodies and is particularly directed to improvements in the structure of the doors usually provided at the rear of the trailer or truck body. More specifically the improved door constructions of this invention are adapted for closing the rear end of a closed body structure.

In completing the invention exemplified by the embodiment disclosed herein, it has been the object of the inventor to provide an improved door structure wherein; the door is more rigid due to marginal reinforcement; wherein the door is neater and more finished in its appearance than heretofore due to a countersunk arrangement of the lining panel relative to the marginal reinforcement; wherein the hinges are attached to the door structure in a more rigid manner than heretofore; whereby there is less opportunity for the doors to loosen at their connection to the hinges which loosening might frequently occur due to the heavy service which these trailer truck bodies encounter over rough roads; and wherein the door has concealed reinforcing means in which the hinge bolts may be concealed.

Other objects and further advantages will be more fully apparent from a description of the accompanying drawing, in which.

Figures 1, 2, 3:
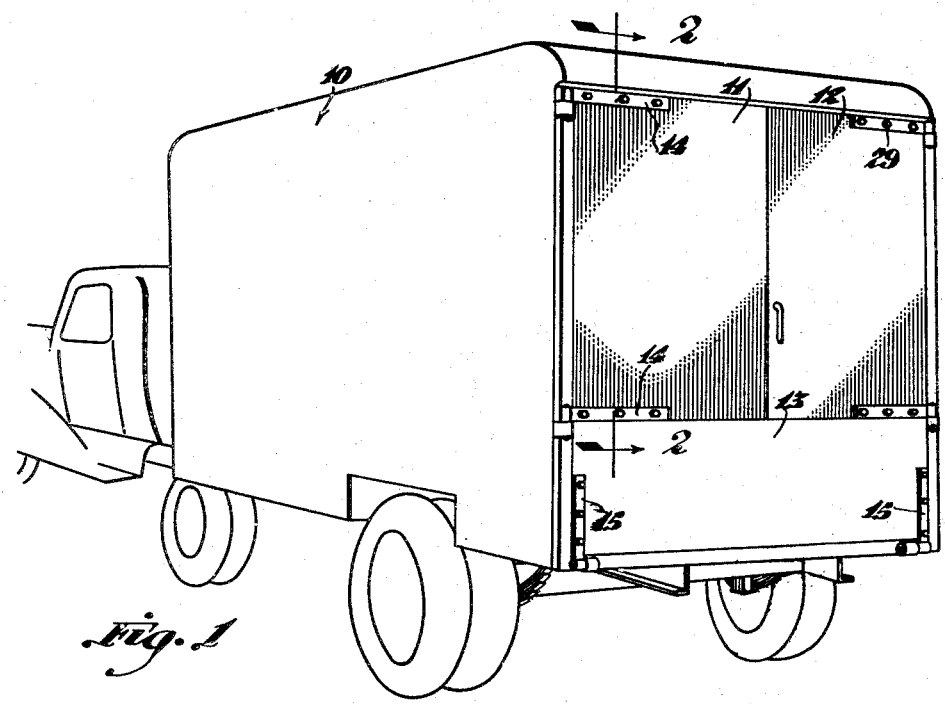
Figure 1 is a perspective view of a trailer body embodying the improved door structure of this invention.
Figure 2 is a cross sectional view in perspective taken on line 2—2 of Figure 1 illustrating the construction of one of the doors.
Figure 3 is a view similar to Figure 2 showing a modification of the door structure wherein the reinforcing channels of the door are constructed of separate parts in order to facilitate special production.

Referring to Figure 1 of the drawing, a trailer body indicated generally at 10 is equipped with doors 11 and 12 and an end gate 13. The doors are swung on hinges 14 which are fastened at the sides of the trailer body. The end gate is swung on hinges 15 which are fastened to the floor of the trailer body.

The door disclosed in Figure 2 is fabricated from a single sheet of metal. In the preferred embodiment the blank sheet of metal is cut angularly at the corners and is formed to provide reinforcing channels 17 adjacent to and spaced inwardly from four edges of the sheet as defined by a marginal strip 18. The reinforcing channels 17 comprise two U-bends. An outer U-bend 19 is of less height than an inner U-bend 20. The outside face of the metal is indicated at 21 and the two U-bends 19 and 20 are formed to extend from the outer face of the metal. In forming the door, the channeled portions of the sheet are doubled over inwardly along a fold line indicated at 22. In the blank this fold line is spaced inwardly from the inner channel. When the metal is folded over, a lip 23 of double thickness is formed. The channel or U-bend 20 is now the outer channel and it is spaced inwardly from the edge of the door as defined by the lip 23. Moreover, the angular cuts previously referred to, made at the four corners of the blank sheet, now form abutting welded miter joints 24 at the four corners of the door.

When the channeled portion of the door is doubled over, the above mentioned marginal strip 18 lies flatly against the inside face of the door. Also the strip of metal 25 between the two channels 19 and 20, lies against the inner face of the door. A row of rivets through the marginal strip 18 and the door or a series of spot welds here, provides the necessary bond between the door and the channeled section.

From the foregoing it may be seen that the door has two reinforcing channels or ridges, spaced from each other, which constitute a double frame running completely around the margin of the door.

The inner channel in the door is now the one of lesser height. The difference in height is equal to the thickness of a plywood panel 26. The panel 26 fits into the space defined by the inner side of the channel 20 and lies on top of the inner channel 19, being secured thereto by means of screws 27. The panel 26 extends over the strip 25 between the two channels and abuts the inner side of the channel 27 to provide an even surface over the entire inside of the door.

Packing 28 may be inserted between the panel and the inside of the door to provide insulation against temperature changes and vibrations.

The doors are hinged at their sides and swing together to join in the middle of the back of the trailer. In operation, and especially over rough roads, the doors of a trailer are constantly vibrating with relation to the trailer body. This action has a tendency to enlarge the holes in the doors through which the hinge bolts project. The hinge bolts, indicated at 29, in this instance, pass through the double thickness of metal as provided by the door and strip 25. Consequently, the tendency to loosen is minimized. The hinge bolts, located in between the two channels are hidden from view by the panel 26, and so offer no projections to catch clothing or the edges of boxes of merchandise during loading and unloading operations.

By reason of their construction the doors resist all distortional forces. That is, the plywood panel abutting the sides of the outer channel resists forces tending to distort the doors out of square, the channels resist bending and the channeling and panel resist warping. When the doors are abutting one another and are locked in place, they resist the tendency of the back end of the trailer to distort when the trailer is going around a bend at high speed.

In Figure 3 a modification of the channeling is shown. In this instance, the channeling is made separately from the door panel to facilitate special production methods. The door embodies the same arrangement of channeling and has a plywood panel mounted in the same manner as disclosed in Figure 2. This modification lies in the manner of fabrication. The structure in this instance is not formed of a single sheet of metal but is composed of frame members 30 and a door panel member 31, welded together as at 32 to make up the door. The purpose of this structure is to expedite the production of doors of special size. The frame members are made up and stored in lengths. When a door not of standard size is needed the frame members are cut and mitered to the proper lengths and welded to a metal panel cut to the required size to make up the door.

Having described my invention, I claim:

1. A door for a truck or trailer body, comprising, a rectangular sheet metal panel incorporating spaced formed channels along its margins, the inner of said channels being of less height than the outer, and an inner door panel of an area equal to that defined by the inner walls of the outer channels and of a thickness substantially equal to that of the difference in height of the channels, means for securing the inner panel to the inner channels, hinges secured to the outer face of the outer panel and hinge bolts disposed through the outer panel between the spaced channels thereof.

2. A door for a truck or trailer body comprising, a rectangular sheet metal panel incorporating spaced formed channels along its margins the inner of said channels being of less height than the outer, and an inner door panel of an area equal to that defined by the inner walls of the outer channels, and means for securing the inner panel against the inner channels.

JAMES J. BLACK.